United States Patent
Shah

(10) Patent No.: US 9,181,929 B2
(45) Date of Patent: Nov. 10, 2015

(54) ACTUATOR WITH EFFICIENT ENERGY ACCUMULATION

(71) Applicant: ROTEX MANUFACTURERS AND ENGINEERS PRIVATE LIMITED, Maharashtra (IN)

(72) Inventor: Amit Shah, Mumbai (IN)

( * ) Notice: Subject to any disclaimer, the term of this patent is extended or adjusted under 35 U.S.C. 154(b) by 306 days.

(21) Appl. No.: 13/913,526

(22) Filed: Jun. 10, 2013

(65) Prior Publication Data
US 2014/0250878 A1    Sep. 11, 2014

(30) Foreign Application Priority Data
Mar. 8, 2013    (IN) .......................... 701/MUM/2013

(51) Int. Cl.
*F03G 7/00* (2006.01)
*F15B 15/06* (2006.01)
*F15B 15/14* (2006.01)

(52) U.S. Cl.
CPC ............... *F03G 7/00* (2013.01); *F15B 15/065* (2013.01); *F15B 15/1476* (2013.01)

(58) Field of Classification Search
CPC ............ F03G 7/00; F15B 1/02; F15B 15/065; F15B 15/06; F15B 15/1447; F16F 1/08; F16K 31/1221; F16K 31/54; F01L 1/465

USPC ................................. 92/130 D, 136; 251/337
See application file for complete search history.

(56) References Cited

U.S. PATENT DOCUMENTS

| | | | | |
|---|---|---|---|---|
| 3,751,025 A | * | 8/1973 | Beery et al. ................. | 267/166.1 |
| 4,111,407 A | * | 9/1978 | Stager .......................... | 267/166.1 |
| 4,905,574 A | * | 3/1990 | Trevisan ....................... | 92/69 R |
| D336,600 S | * | 6/1993 | Edlund .......................... | D8/71 |
| 5,772,191 A | * | 6/1998 | Nakano et al. ................. | 267/289 |
| 6,173,740 B1 | * | 1/2001 | Marinoni et al. ............. | 137/554 |
| 7,182,310 B2 | * | 2/2007 | Chen .............................. | 251/69 |
| 7,357,381 B2 | * | 4/2008 | Wakamori et al. ............ | 267/179 |

FOREIGN PATENT DOCUMENTS

| | | |
|---|---|---|
| GB | 2225079 A | 5/1990 |
| WO | WO2010063514 A1 | 6/2010 |

* cited by examiner

*Primary Examiner* — Joshua Kennedy

(57) ABSTRACT

An actuator having an efficient energy accumulation with a plurality of progressively varying diameter compression spring, pre-compressed with ends connected through a telescopic arrangement. A construction having a raised boundary and a recession provided on a piston side and an actuator cover to retain the springs. The efficient energy accumulation system requires less accommodating volume and is "buckle" free.

12 Claims, 7 Drawing Sheets

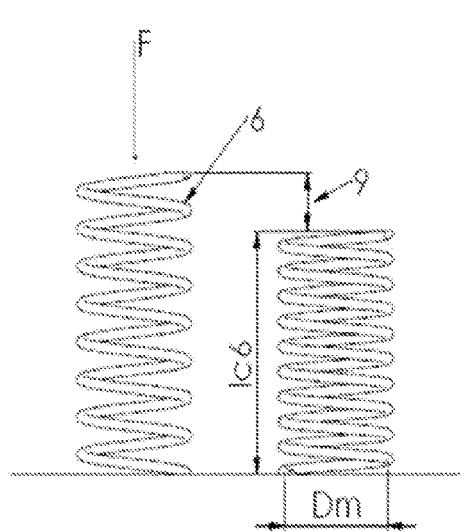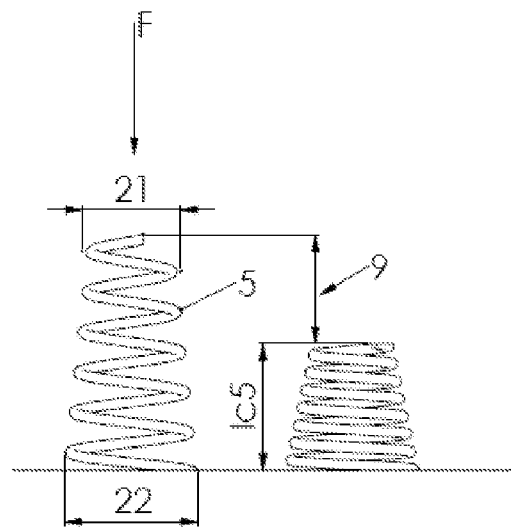
Figure-6                    Figure-6A

ACTUATOR WITH EFFICIENT ENERGY ACCUMULATION

FIELD OF THE INVENTION

The present invention relates to actuator and particularly energy accumulation and energy release in the actuator.

OBJECTIVE

The objective is to invent an actuator which is easy to assemble and maintain.

Another objective is to invent an actuator which operates noiselessly and has longer operational consistency in life.

Yet another objective is to achieve reduction in volume of energy accumulation system and thereby improve the response time of return stroke.

BACKGROUND OF THE INVENTION

Actuators are used to remotely operate the valves for controlling the flow of fluids.

Several designs of the actuators are known which convert reciprocating linear motion into bi-directional rotation; GB 2225079A being one such patent. In such design, linear motion in one direction is caused by injecting pressurized fluid (generally air) which acts on pistons, held at that location by mechanical energy accumulators, like compression springs. While pistons move, they also compress the springs, thereby accumulating energy in them. As the pressure is released, the pistons are made to move back consequent to springs releasing the accumulated energy.

The energy accumulators are generally tough springs needing several kg of force to compress and assemble them in the actuator.

There is need to change the operating torque of the actuator so as to synchronize it with the air pressure available, torque of the valve and the type of the valve. The seals and gear arrangement inside the actuator need regular maintenance; and therefore, energy accumulators need to be removed at regular intervals and re-assembled, thereby needing skill and fixtures to assemble, which is time consuming and resulting in increased downtime.

In another prior art, disclosed in WO2010/063514 A1, instead of one or more concentric big compression springs, several small compression springs are used, axially parallel to one another to solve the problem of variable torque needed as discussed above. However, this arrangement is not efficient since the ratio of "length to diameter" of the parallel springs is more than the limit, above which spring is not able to maintain its axis straight under energy accumulated i.e. compressed condition. Due to such "buckling", the coils of spring entangle and disentangle during operation, producing noise and adversely effecting the response time of actuators.
Our invention solves both these problems.

STATEMENT OF INVENTION

Our invention is the energy accumulator assembly by deploying compression spring of progressively varying diameter such that the spring in compressed or energy accumulated condition always maintains its axis straight. There are multiple combinations in which such springs can be assembled—either all springs with bigger diameter at one end and smaller diameter at the other end; or any permutation of relative orientation. The embodiment described here is by assembling the progressively varying diameter compression spring, laid alternately such that overall diameter of the assembly is the same at both ends.

Since the fully compressed length of such spring can be reduced much below the length of the corresponding constant diameter spring, much smaller length of spring is required to produce same force, which is exploited in reducing the volume of energy accumulation system. This further improves the response time since the volume of air to be transacted back and forth from narrow path is reduced.

BRIEF DESCRIPTION OF DRAWINGS

FIG. 6 and FIG. 6A show comparative lengths of constant diameter spring verses progressively varying diameter telescopic spring, other nomenclature used in describing calculations.

DETAILED DESCRIPTION OF INVENTION

Figure 1:
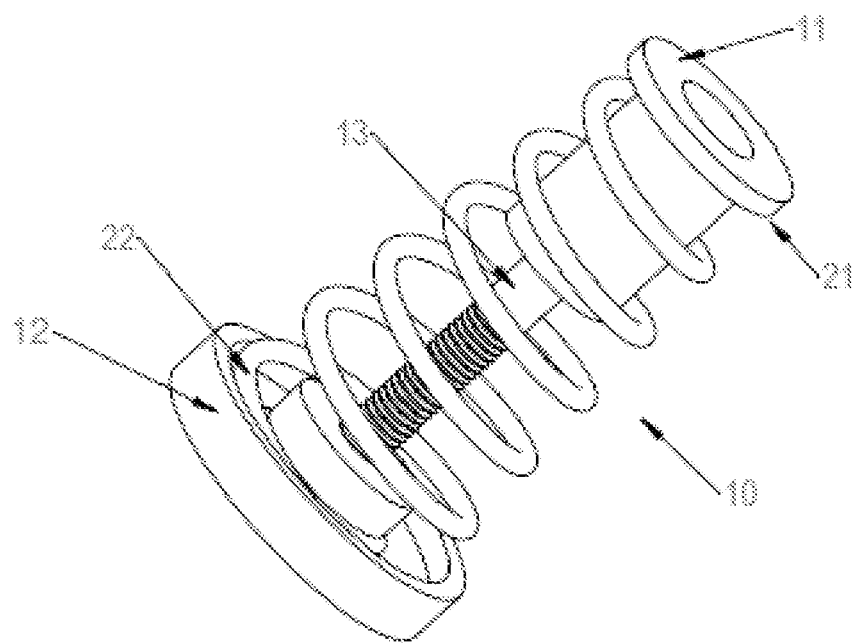
FIG. 1 shows the cartridge of progressively varying diameter compression spring, pre-compressed using telescopic arrangement.
Figure 2:
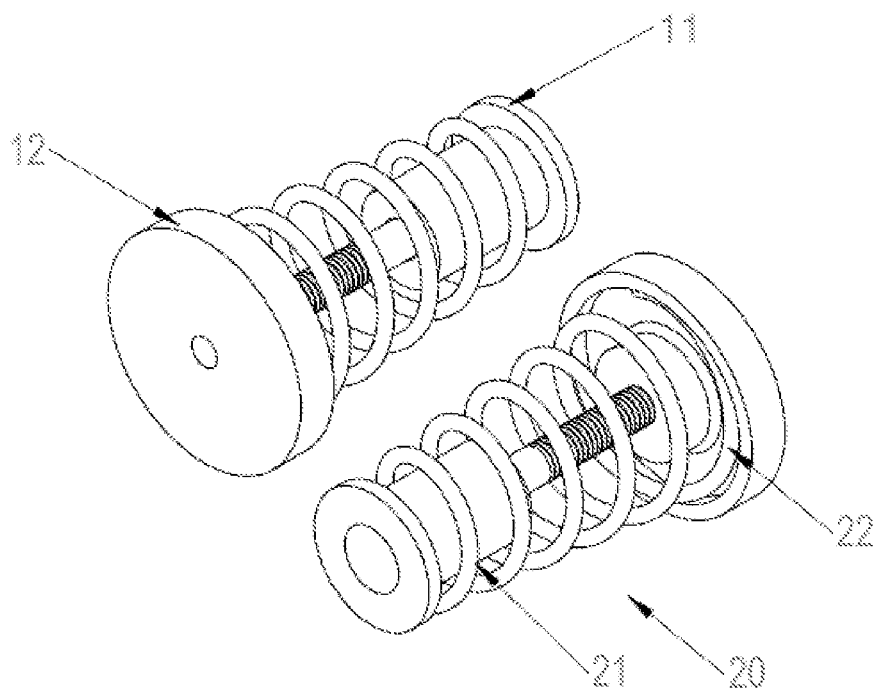
FIG. 2 shows the preferred arrangement of laying cartridges of pre-compressed progressively varying diameter compression spring.
Figure 3:
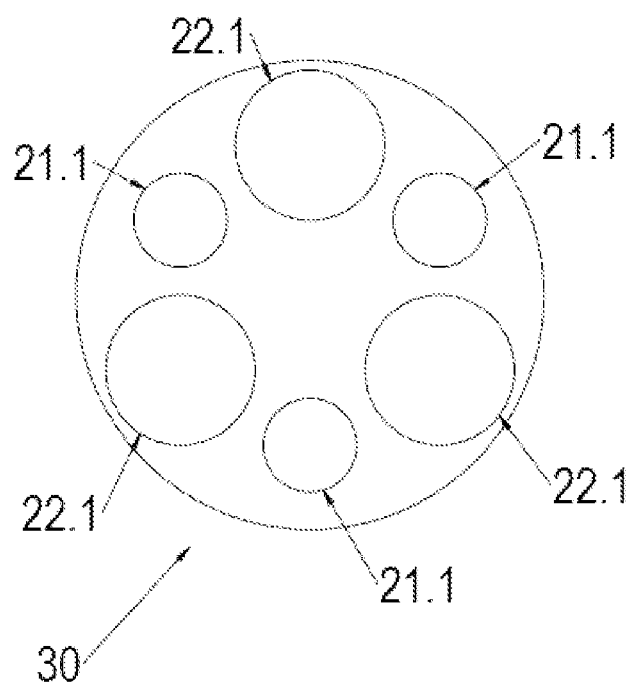
FIGS. 3 and 3-A shows construction of piston side and actuator cover to guide energy accumulation system.
Figure 3A:
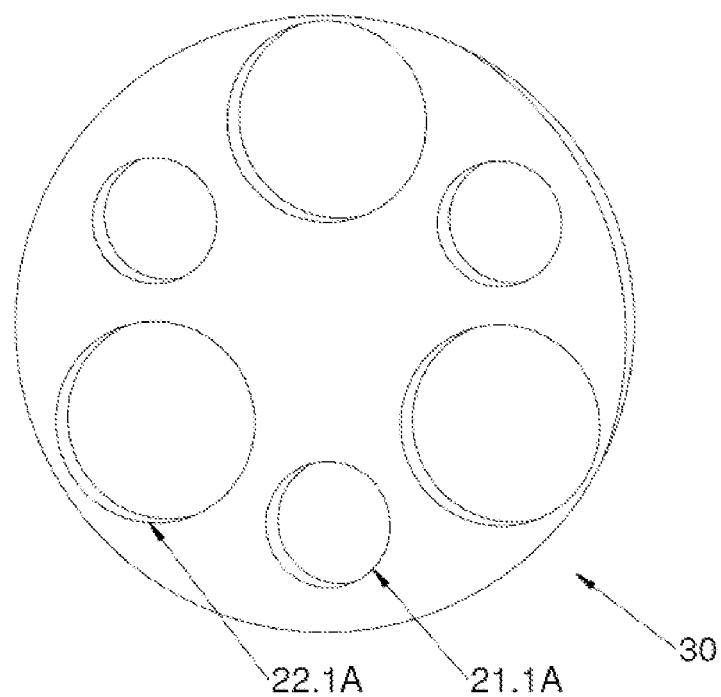
Figure 4:
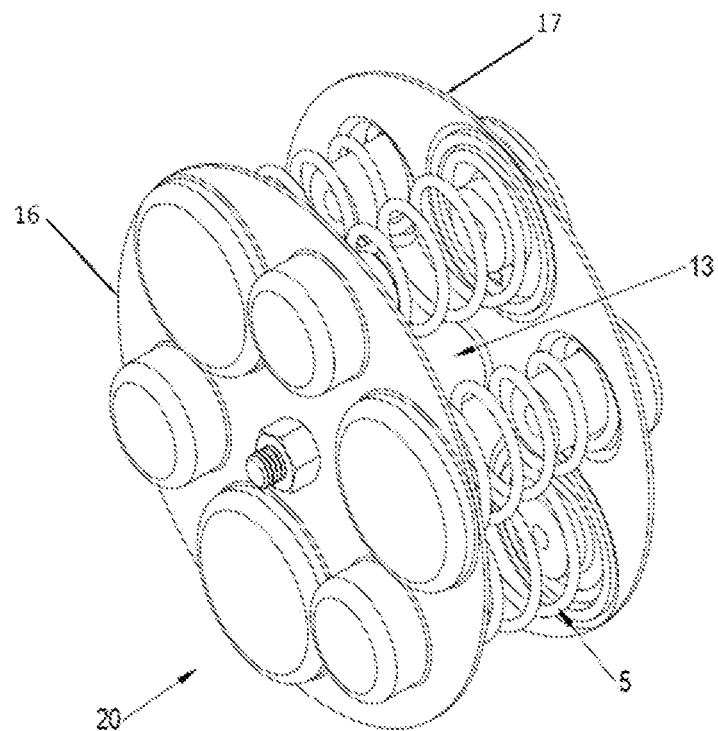
FIG. 4 shows another embodiment with collective end covers and common telescopic arrangement.
Figure 5:
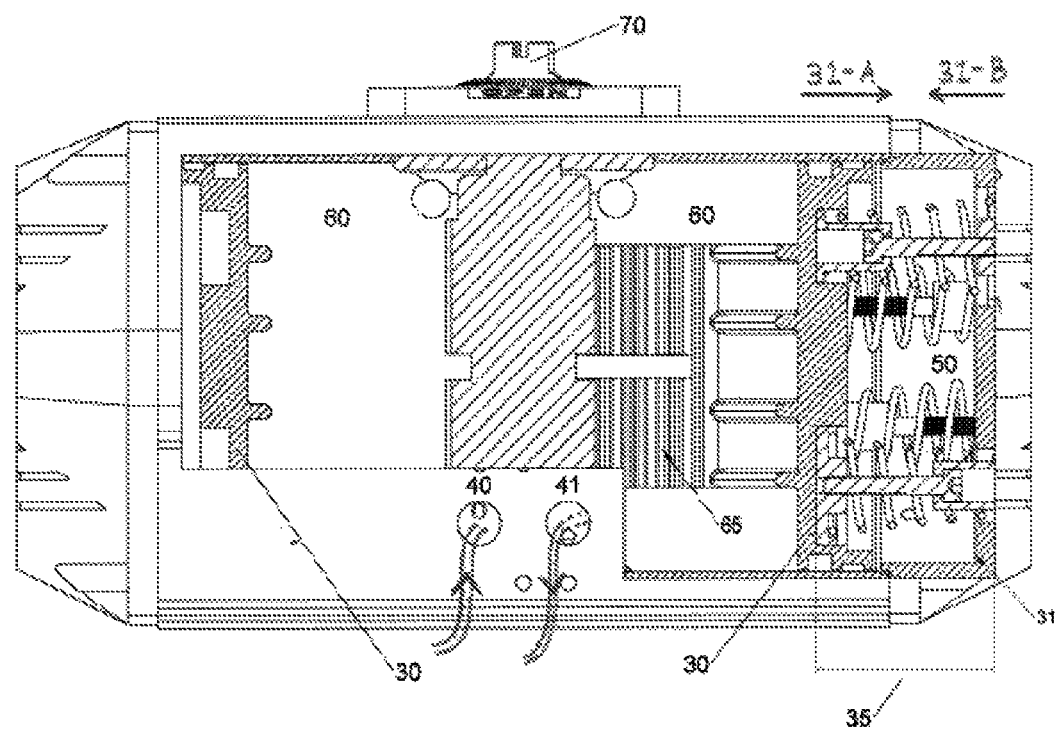
FIG. 5 shows sectional side view of actuator with efficient energy accumulation system in place.

Preferred embodiment of actuator with progressively varying diameter compression spring according to the present invention will now be described in detail, with reference to the accompanying drawings. The terms and expressions which have been used here are merely for description and not for limitation.

The efficient energy accumulation system (20) is essentially a magazine or group of plurality of progressively varying diameter compression spring (5) or cartridges (10). Each cartridge (10) consists of a progressively varying diameter compression spring (5), and pre-compressed by ends (11, 12) connected through a telescopic arrangement (13). The magazine has a group of progressively varying diameter compression spring (5), pre compressed by a collective end A (16) and a collective end B (17). A telescopic arrangement (13) connects the collective end A (16) and the collective end B (17). A group of cartridges (10), substantially in a circle or in any other formation or the magazine placed between a piston side (30) and an actuator cover (31).

The progressively varying diameter compression spring (5) is designed to arrive at telescopic, partially telescopic or non-telescopic design, meaning thereby that the spring can be compressed up to length=wire diameter (d).

In contrast, a constant diameter compression spring (6), as known in prior art, cannot compress below the solid length ($l_{c6}$) which is a multiplication of number of turns n and wire diameter d. To generate reaction force (F), (which depends on the valve to be operated) the spring length has to be necessarily more than the multiplication of no. of turns n and diameter d, while this limitation is eliminated by using progressively varying diameter compression spring (5).

This aspect is described with an illustrative comparison as below.

Let us take reaction Force (F)=10 kg and stroke (9)=10 mm
Spring Constant C=Force (F)/stroke (9)=1 kg/mm Also, we take spring of wire diameter (d)=3 mm and mean diameter ($D_m$)=25 mm and material with Modulus of Elasticity=8150 kg/mm2.

For these boundary conditions, let us work out solid lengths of constant diameter and progressively varying diameter spring.

For Constant Diameter Spring $$No.\ of\ active\ turns\ n = 8150 \times \frac{d^4}{8} \times C \times D_m^3$$
$$= 5.5$$

$$Total\ number\ of\ turns\ N = n + 1.5$$
$$= 5.5 + 1.5$$
$$= 7.0$$

$$Solid\ length (l_{c6})\ of\ Constant\ diameter\ spring = 7 \times 3$$
$$= 21\ mm$$

For Progressively Varying Diameter Spring
We take $D_{major}$ (22)=40 mm and $D_{minor}$ (21)=10 mm
So that mean diameter $D_m$=25 mm
Thus, all functional parameters remain the same.

$$Solid\ length(l_{c5})\ of\ varying\ diameter\ spring =$$
$$SQRT((n \times d)^2 - ((D_{major}/2) - (D_{minor}/2))^2) = 14.7\ mm.$$

Thus progressively varying diameter spring (5) needs less space as compared to cylindrical or constant diameter spring (6), which is directly proportional to difference of solid lengths ($l_{c6}$) and ($l_{c5}$) for the identical reaction force (F) and displacement or stroke (9).

As is known in prior art, when one or more concentric spring is used in such actuators, which are of diameter substantially comparable to the that of the piston (30), the "length to diameter" ratio remains well below 4, and thus spring does not lose its straightness i.e. it does not "buckle"; however when a number of parallel springs are used, length to diameter ration is invariably more than 4. Not only such springs buckle, they also produce noise while entangling and disentangling, also adding to response time in negotiating.

In case of progressively varying diameter compression spring (5), this ratio of length to diameter is of virtually no significance due to shift in the centre of gravity of the spring towards the wider base.

The cartridge (10) is assembled in the actuator between piston end (30) and actuator cover (31) with minimum diameter end of alternate cartridges (10) on one side so as to maintain substantially same average diameter of the magazine on both sides. However, any other arrangement is also possible.

In order to retain the cartridge (10) at decided location, the piston side (30) and the actuator cover (31) have construction having raised boundary or recession (21.1A and 22.1A) of diameter (21.1) and (22.1), correspondingly higher than diameter (21) and (22) of the progressively varying diameter compression spring (5).

Such a raised boundary or recession could alternatively be either individual for each cartridge (10) or collectively common for plurality of progressively varying diameter compression springs (5).

When pressurized air is injected through orifice (40) in gear zone (60), the piston (30) moves in direction 31-A, displacing out the air previously present in space (50). Time taken to complete this action depends also on the air volume to be displaced from space (50). In the reverse case, i.e. when there is no pressure build up in gear zone (60), energy accumulated in the cartridges is released to push back the piston (30) in direction 31-B, but time taken for the energy release also depends on the air refilling. The air removal and refilling in turn depends on the volume of the space (50). Thus, any reduction in dimension (35) of the space (50), consequent to reduced length of cartridge (10) by use of progressively varying diameter spring (5) results in faster response of the actuator.

The pistons (30) typically have a connected rack or equivalent gear arrangement (65) to couple pistons (30) with protruding shaft (70) via pinion or equivalent arrangement on protruding shaft (70) thereby transmitting the linear motion into rotary motion for operating the valve.

Since the volume occupied by this energy accumulation system is relatively smaller because solid length ($l_{c5}$) of progressively varying diameter compression springs is less than solid length ($l_{c6}$) of constant diameter spring used in prior art, the response time of actuator (=time to rotate the driven valve) is shorter.

The coils of the spring cannot entrap one another due to progressively varying diameter and absence of the defect of buckling, consequent to which the coils do not entangle/disentangle and do not rub against one other on either side. The energy accumulation and de-accumulation function due to compression and de-compression action is thereby noise free.

I claim:

1. An actuator with an efficient energy accumulation, comprising of a protruding shaft suitable for connecting with a driven valve and capable of rotating bi-directionally substantially by 90 degree, by a rack and pinion arrangement, driven by a plurality of pistons pushed by a pressurized fluid on one side and assembly of resisting energy accumulator system on the other side; the energy accumulator system characterized in that:

a cartridge comprising a progressively varying diameter compression spring having a minimum diameter end and a maximum diameter end pre compressed by said ends connected through a telescopic arrangement;

an axis of the progressively varying diameter compression spring, substantially remains a straight line in all conditions of compression;

each spring turn of the progressively varying diameter compression spring does not entangle and disentangle, allowing a noise free accumulation and release of energy;

a construction having a raised boundary or a recession provided at decided locations on a piston side and an actuator cover to retain the cartridge ends; and a group of said cartridges retained by the construction provided on the piston side and the actuator cover, substantially in a circle or in any other formation.

2. The actuator with the efficient energy accumulation as claimed in claim 1, wherein said group of cartridges are arranged with the minimum diameter end of alternate progressively varying diameter compression springs facing the piston side; and the maximum diameter end of alternate progressively varying diameter compression springs facing the actuator cover.

3. The actuator with the efficient energy accumulation system as claimed in claim 1, wherein said group of cartridges are arranged with the minimum diameter end of all or some progressively varying diameter compression springs facing the piston side, and the maximum diameter end of all or some progressively varying diameter compression springs facing the actuator cover.

4. The actuator with the efficient energy accumulation as claimed in claim 1, wherein each raised boundary or recession has a diameter greater than the minimum diameter end and the maximum diameter end of the progressively varying diameter compression spring, respectively.

5. An actuator with an efficient energy accumulation, comprising of a protruding shaft suitable for connecting with a driven valve and capable of rotating bi-directionally substantially by 90 degree, by a rack and pinion arrangement, driven by a plurality of pistons pushed by a pressurized fluid on one side and assembly of resisting energy accumulation system on the other side; the energy accumulation system characterized in that:
- a progressively varying diameter compression spring having a minimum diameter end and a maximum diameter end;
- an axis of the progressively varying diameter compression spring, substantially remains a straight line in all conditions of compression;
- each spring turn of the progressively varying diameter compression spring does not entangle and disentangle, allowing a noise free energy accumulation and release of energy;
- a group of said progressively varying diameter compression springs arranged substantially in a circle or in any other formation, pre compressed between a collective end A and a collective end B of said springs;
- a telescopic arrangement connecting the collective end A and the collective end B such that the group of progressively varying diameter compression springs form a magazine.

6. The actuator with the efficient energy accumulation as claimed in claim 5, wherein said collective end A and said collective end B each comprise a construction having a raised boundary or a recession corresponding to each of the progressively varying diameter compression springs to retain the group of progressively varying diameter compression springs there between.

7. The actuator with the efficient energy accumulation as claimed in claim 6, wherein each of said raised boundary or recession has a diameter higher than the respective minimum diameter end and the maximum diameter end of a respective progressively varying diameter compression spring retained in the construction collective ends.

8. The actuator with the efficient energy accumulation as claimed in claim 5, wherein said magazine is arranged with the minimum diameter end of alternate progressively varying diameter compression springs facing the collective end A and the maximum diameter end of alternate progressively varying diameter compression springs facing the collective end B.

9. The actuator with the efficient energy accumulation as claimed in claim 5, wherein said magazine is arranged with the minimum diameter end of all or some progressively varying diameter compression springs facing the collective end A and maximum diameter end of all or some progressively varying diameter compression springs facing the collective end B.

10. The actuator with the efficient energy accumulation as claimed in claim 5, wherein said magazine is retained between a piston side and an actuator cover side in the actuator.

11. The actuator with the efficient energy accumulation as claimed in claim 1 or claim 5, wherein said energy accumulation system has a relatively smaller volume due to the progressively varying diameter springs.

12. The actuator with the efficient energy accumulation as claimed in claim 1 or claim 5, wherein said energy accumulation system due to the progressively varying diameter springs having a reduced length has a faster response time.

\* \* \* \* \*